Aug. 27, 1929.    I. S. DEMENT    1,725,978
REGISTERING DEVICE
Original Filed Jan. 2, 1924    2 Sheets-Sheet 1
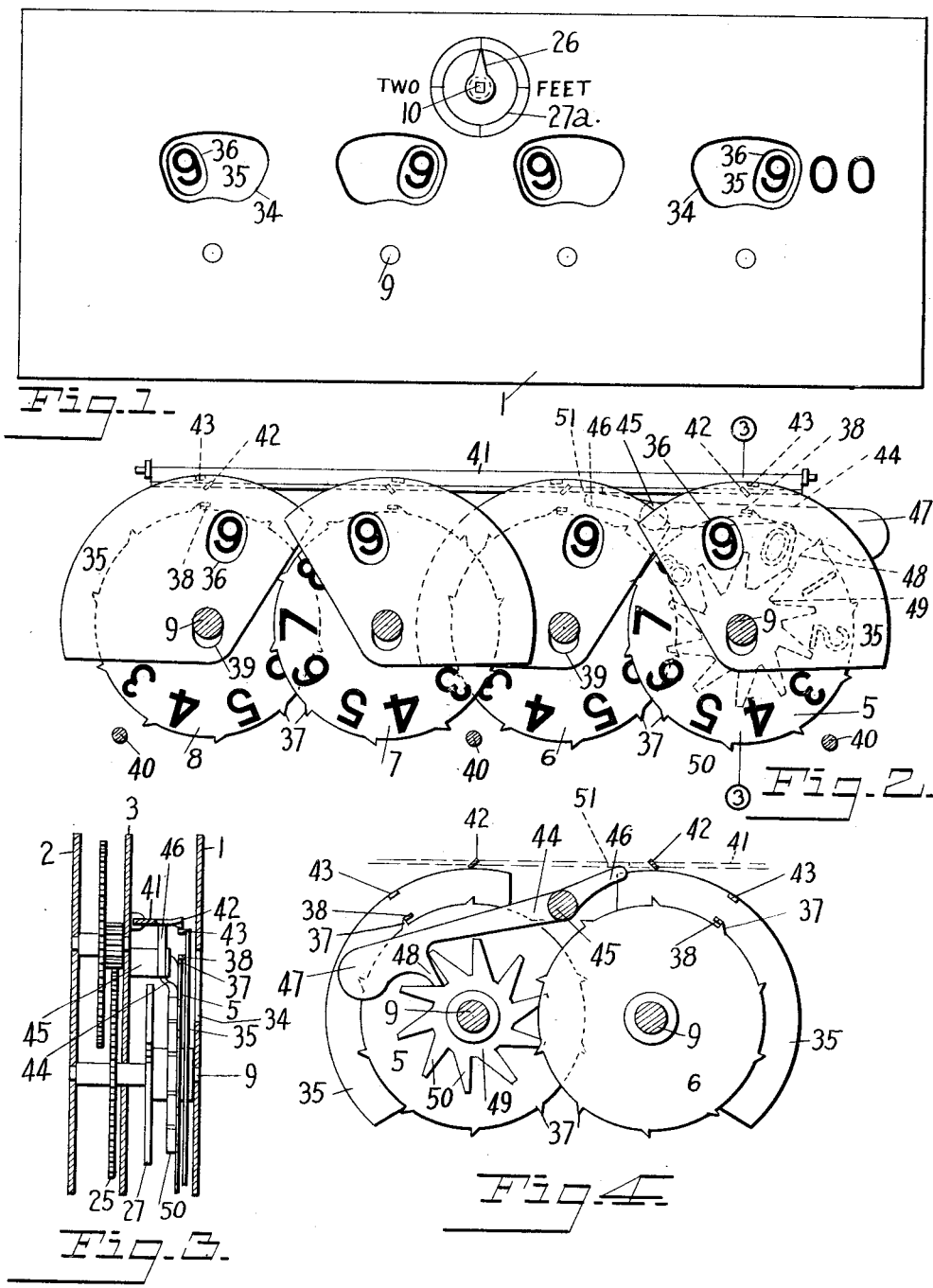
INVENTOR.
ISAAC S. DEMENT.
ATTORNEY.

Aug. 27, 1929.  I. S. DEMENT  1,725,978
REGISTERING DEVICE
Original Filed Jan. 2, 1924  2 Sheets-Sheet 2
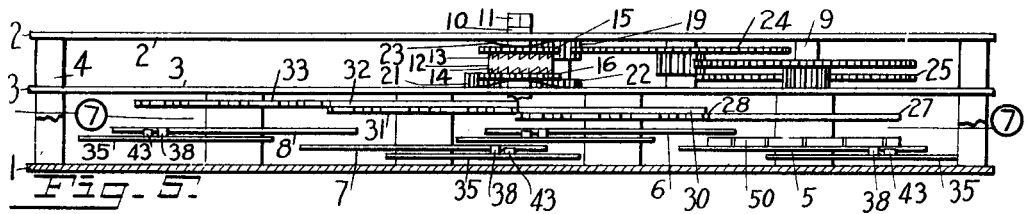
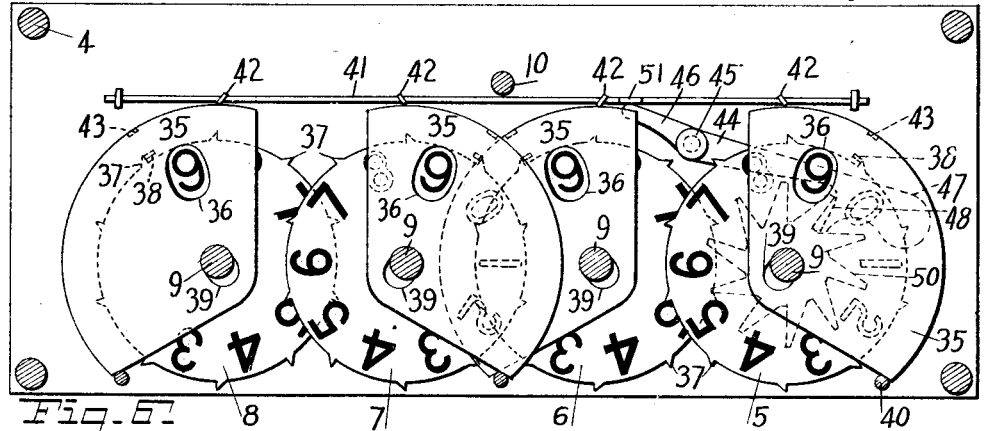
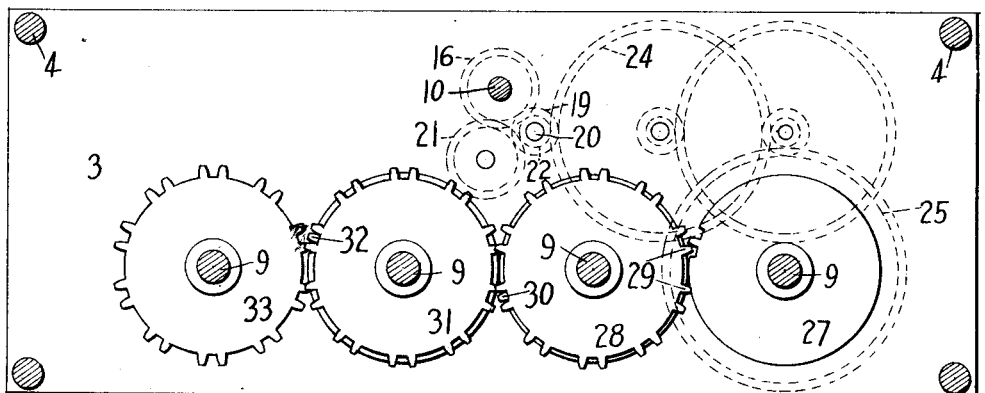
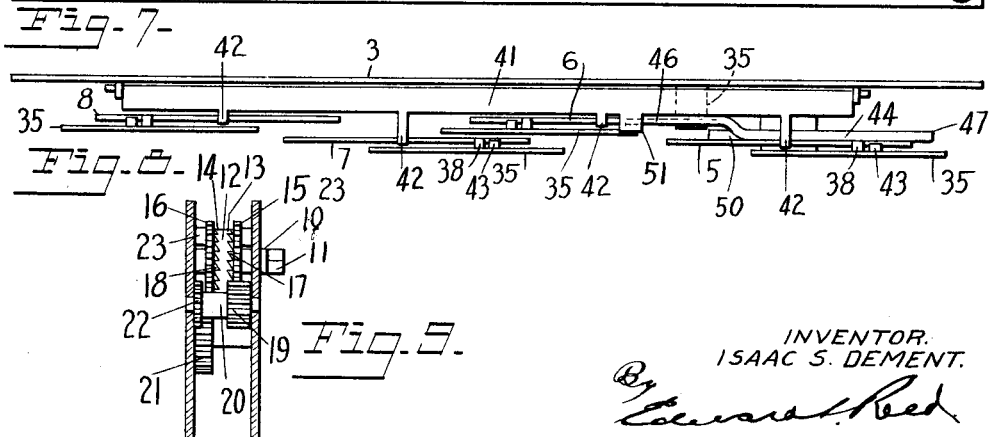
INVENTOR.
ISAAC S. DEMENT.
ATTORNEY.

Patented Aug. 27, 1929.

1,725,978

UNITED STATES PATENT OFFICE.

ISAAC S. DEMENT, OF DAYTON, OHIO.

REGISTERING DEVICE.

Application filed January 2, 1924, Serial No. 683,374. Renewed November 18, 1925.

This invention relates to registering devices and more particularly to an index for meters and the like. One objectionable feature common to many if not all registering indexes as heretofore produced has been the fact that due to the slow movement of the indicating members the succeeding numeral will be moved into line or partially into line with the sight opening before the preceding numeral has cleared the sight opening. As a result the parts of two numerals will, at times, appear in the opening and if a reading is taken at this time it is difficult and sometimes impossible to get a correct reading. If the openings are made large enough to expose both numerals it is difficult to determine which one represents the correct registration.

One object of the present invention is to provide a direct reading index in which a single numeral will be fully exposed at the sight opening in all positions of the indicating member.

A further object of the invention is to provide an index of this character in which one numeral of each indicating member will be fully exposed until the indicating member has completed the registration of another unit, that is, has moved a distance equal to the space between two numerals, and then the first mentioned numeral will be concealed and the succeeding numeral exposed.

A further object of the invention is to provide such an index in which the succeeding numeral will be concealed and the preceding numeral exposed on the several indicating members simultaneously.

A further object of the invention is to provide a registering device in which the counter will be moved in a forward direction by the rotation of the driving member in either direction, thus causing the correct registration to be made even though the meter be reversed.

A further object of the invention is to provide such a device which will be simple in its construction, positive in its operation and which can be produced at a low cost.

Other objects of the invention will appear as the device is described in detail.

In the accompanying drawings Fig. 1 is a front elevation of a registering device embodying my invention: Fig. 2 is a front elevation of the mechanism of such a device with the front plate removed; Fig. 3 is a section taken on the line 3—3 of Fig. 2; Fig. 4 is a rear elevation of the hundreds and thousands indicating member with their associated devices; Fig. 5 is a top plan view of the apparatus, omitting the controlling device; Fig. 6 is a view similar to Fig. 2, showing the parts in their initial positions; Fig. 7 is a sectional view taken on the line 7—7 of Fig. 5, showing the gear train in elevation; Fig. 8 is a plan view of the indicating members and their cooperating devices, showing the controlling device therefor; and Fig. 9 is a detail view of the two-way driving mechanism.

In these drawings I have illustrated one embodiment of my invention and have shown the same as applied to an index comprising a series of dials having the indicating numerals on their flat faces, but it will be understood that the apparatus may take various forms and that it may be applied to registering devices of various kinds without departing from the spirit of the invention.

In that form here shown the apparatus comprises a main frame consisting of a front plate 1, rear plate 2 and an intermediate plate 3, the several plates being connected one to the other by tie rods 4. Mounted between the frame members 1 and 3 are a series of indicating members or dials 5, 6, 7 and 8, these dials being preferably mounted on shafts 9 mounted in said frame members. Each dial is provided on its face with the numerals 0 to 9 inclusive. The dial 5 is, in the present device, adapted to register hundreds, the dial 6 thousands, the dial 7 tens of thousands, and the dial 8 hundreds of thousands. The dial of lowest denomination, the hundreds in the present instance, may be driven in any suitable manner from the meter mechanism or other source of power. In the present device, I have journaled in the rear plate 2 and the intermediate plate 3 of the main frame a shaft 10 adapted to be connected with meter mechanism and, in the prersent instance, having its rear end squared, as shown at 11, to receive a connecting member. The driving shaft 10 is rotatable in either direction but in order to prevent the reverse operation of the registering device, should the meter be reversed, I have provided driving connections between the shaft and the initial counter of the registering device of such a character that the counter will be rotated in a forward direction by the rotation of the shaft in either direction. To this end two pinions or gears are so connected with the shaft, as by means of opposed overrunning clutches, that one gear will rotate with the shaft when the latter rotates in one direction and the other gear will rotate with the shaft when the latter rotates in the opposite direction. The two gears are so connected with the counter that although they rotate in opposite directions they will both move the counter in the same direction. Preferably the two gears are connected with the counter by permanently meshing gear trains one of which comprises an intermediate gear to reverse the direction of its movement. In the present form of the device I have rigidly secured to the driving shaft, between the two frame members, a clutch member 12 having on the two sides thereof clutch teeth 13 and 14, respectively, these clutch teeth being here shown as ratchet teeth and the teeth on the two sides of the clutch facing in opposite directions. Rotatably and slidably mounted on the shaft 10 on opposite sides of the clutch member 12 are two gears, 15 and 16, each having on its inner face clutch teeth, 17 and 18, adapted to engage corresponding clutch teeth on the clutch member 12. These gears are pressed toward the clutch member by springs 23. The gear 15 meshes with a pinion 19 rigidly secured to a shaft 20 mounted in said frame members, while the gear 18 meshes with an idle gear 21 which in turn meshes with a pinion 22 rigidly secured to the shaft 20, so as to rotate in unison with the pinion 19. It will be noted that if the shaft 10 is rotated in one direction the clutch member 12 will pick up and rotate the gear 15 and movement will be imparted directly therefrom to the pinion 19. During this movement the gear 16 will yield and the teeth of the clutch will ride over the teeth of that gear, thereby permitting the gear 16 to be rotated in a reverse direction by the action of the pinion 22 and gear 21. If the shaft is rotated in the opposite direction the clutch member will pick up the gear 16 and movement will be transmitted therefrom through the gear 21 and pinion 22 to the pinion 19, the gear 15 being rotated in a reverse direction. In this manner the gear 19 is rotated in the same direction regardless of the direction in which the shaft 10 is rotated, thereby making it imposible to operate the registering devices in a reverse direction. The pinion 19 meshes with a gear 24 which is connected through a suitable train of gearing with a gear 25 rigidly secured to the shaft 9 which carries the hundreds indicator dial 5 and the ratio of the gearing is such as to cause the desired movement to be imparted to the indicator dial from the shaft 10. In the present construction the shaft 10 makes one complete rotation for each two feet of gas and inasmuch as the hundreds dial 5 registers in units of one hundred feet it will be apparent that it will be advanced one step, that is, the distance between two numerals, for each fifty rotations of the shaft 10. As here shown, the shaft 10 is provided with a pointer 26 which travels over a stationary dial 27a on the front plate 1. The count may be transferred from one indicating member to the other in any suitable manner. In the present instance, I have employed Geneva gearing for this purpose as this requires that the dial to which the transfer is made shall move only during the time the transfer is being made. To this end I have secured to the shaft 9 of the hundreds indicator dial 5 a one toothed gear 27 having a concentric peripheral portion and so arranged that its single tooth will mesh with a mutilated gear 28 secured to the dial 6, which gear is provided with ten sets of two teeth each, as indicated at 29, the sets of teeth being spaced apart so that when the single tooth of the gear 27 is not in mesh with a set of teeth 29 the concentric portion of the gear 27 will lie in the space between two sets of teeth and will lock the gear 28 against movement. Connected with the gear 28 and therefore with the thousands indicator dial is a second one toothed gear 30 which meshes with a mutilated gear 31 connected with the tens of thousands indicator dial 7, and a one toothed gear 32 connected with the gear 31 actuates a similar mutilated gear 33 connected with the hundreds of thousands indicator dial 8. This transfer mechanism being of a well known type it is not necessary to further describe the same but it will be apparent that each sucessive indicator dial will be advanced one step for each complete rotation of the preceding indicator dial.

In connection with each of the indicating members or dials I have provided means for exposing to view only that numeral on the dial which represents the actual registration on the dial and for maintaining the same fully exposed so long as it does represent that registration, and for then quickly concealing that numeral and exposing to view the succeeding numeral, which then represents the actual registration. In the present form of the device the front plate 1 is provided with a series of sight openings 34, one for each dial, and these sight openings are of such a size and so arranged that two numerals on each dial may be brought simultaneously into alinement therewith. Associated with the dial and preferably arranged between the same and the sight opening in the front wall of the casing is a shield 35 having therein a sight opening with which the several numerals on the dial will be brought successively into alinement and which is of such a size that it will expose to view but a single numeral. This shield is so actuated that it will be advanced with the dial, and will thus maintain the sight opening in line with a single numeral, until the dial has advanced a distance equal to the space between two numerals and another unit has been added to the registration on the dial. When the dial has reached this position both that numeral which is in line with the sight opening in the shield, which is shown at 36, and the succeeding numeral will be in line with the sight opening 34 in the front wall of the casing, but only the first mentioned numeral will be exposed to view. As the dial reaches this position, in which an additional unit is added to the registration, the shield is shifted to move the sight opening 36 into line with the succeeding numeral, thereby concealing the first mentioned numeral. The shield and the means for controlling the same may take various forms but, as here shown, the shield is substantially sector shaped and is rotatably mounted on the shaft 9 which carries the dial. The dial and the shield have cooperating parts adapted to connect the shield with the dial as it advances from one position to the other and is of such a character that the shield may be disconnected from the dial and permitted to move in a reverse direction independently thereof. Preferably the dial has associated therewith a plurality of projections or teeth 37 which, in the present instance, are mounted directly upon the dial itself and spaced about the periphery thereof, there being one of these projections for each numeral on the dial. The shield has a lug 38 extending from the rear face thereof and arranged to be engaged successively by the teeth on the dial, thus causing the shield to be advanced with the dial so long as one of these teeth is in engagement with the lug 38. The lug may be disengaged from the tooth on the dial in any suitable manner but, as here shown, the shield is moved bodily to cause the lug 38 to be moved out of the path of the tooth on the dial and to this end the bearing opening in the shield is elongated, as shown at 39, and is so arranged that when the shield is in its lowermost position it will have a pivotal movement on the shaft 9, but the shield may be lifted relatively to the shaft to disengage the cooperating parts of the shield and the dial. When the parts have thus been disengaged the shield moves automatically in a reverse direction to its initial position, as shown in Fig. 6, its movement being limited by a stop 40. The reverse movement may be imparted to the dial in various ways, preferably by a spring or by gravity, and with that form of dial here shown I have relied upon gravity alone, the dial being of such a shape that it will, when released, be moved rearwardly by its own weight. Any suitable means may be provided for imparting bodily movement to the shield to disengage the same from the dial but this means is preferably of such a character that the movement of the shield will be automatically imparted thereto by the forward movement of the dial. A plurality of indicating members or dials are employed and it is desirable that the actuating means for releasing the several shields will be so controlled as to cause the several shields to be released simultaneously. If, due to lost motion or back lash in the gear train, the shield for a subsequent dial should not be released until after the shields for the preceding dials had been released and a reading should be taken during the interval between the release of the shields this reading would be inaccurate. I have therefore provided means controlled by the indicating member of lowest denomination for causing the several shields to be released simultaneously. To this end I have mounted in the casing, and preferably on the intermediate frame member 3, a controlling member, here shown in the form of an elongated plate or bar 41 pivotally mounted at its rear edge on the frame member 3 and having on its forward edge a plurality of fingers 42, these fingers being arranged adjacent to the peripheries of the respective shields. Each shield is provided near its periphery with a rearwardly extending lug 43 which is so arranged with relation to the adjacent finger 42 on the controlling member that when this member is in its lowermost position the lug on the shield will be moved into a position above the finger on the controlling member as the shield approaches the end of its movement with the dial. Means are provided for then imparting upward movement to the controlling member, which movement will cause the finger thereon to engage the lug 43 on the shield and lift the latter a distance sufficient to disengage the lug 38 thereon from the tooth 37 on the dial, thereby releasing the shield and permitting the same to move rearwardly. The fingers on the controlling member are preferably inclined so that the lug on the shield will move out of engagement therewith without binding when the shield has been released. The shield being held against reverse movement until the lug 38 has been moved out of engagement with the tooth on the dial the inclined arrangement of the controlling finger will not interfere with the lifting of the shield. In the present form of the device the lifting movement is imparted to the controlling member 41 by means of a lever 44 pivotally mounted on a stud 45 carried by the intermediate frame member 3 and having one end connected with the controlling member in such a manner as to operate the same. As here shown the end of the lever is rounded, as shown at 46, and has free contact with the lower surface of the controlling plate 41, the latter being provided with a forwardly extending lug 51 with which the end of the lever engages. The other end of the lever is weighted, as shown at 47, and has a downwardly extending projection 48 adapted to be engaged and actuated by a suitable actuating member connected with the hundreds dial 5. As here shown, this actuating member is in the form of a disk 49 having a series of fingers or teeth 50, the forward surfaces of which are inclined, so as to successively engage the projection 48 on the lever 44 with a cam action. As here shown the actuating member has the appearance of a ratchet wheel, each tooth of which successively engages the dog or projection 48 on the lever. The arrangement of the teeth on the actuating device is such that as the dial advances the weighted end of the lever will be elevated, thereby permitting the controlling plate to move into its lowermost position, as shown in dotted lines in Fig. 4, and when the dial has completed one step of forward movement, that is, when a succeeding numeral has been brought into indicating position, the tooth will clear the projection or dog 48 and permit the weighted end of the lever to move downwardly thus causing the other end of the lever to elevate the controlling plate. During that portion of the movement of the dial between the lowering of the controlling plate and the elevation thereof the lug 43 of the shield for the hundreds dial will be moved into a position above the corresponding finger 42 on the controlling plate and consequently this shield will be elevated with the plate. The lugs 38 of the shields for such of the remaining dials as have completed one step of movement will also be moved into positions above the corresponding fingers on the controlling plate and consequently when the plate is actuated the shields for all of the dials which are in proper position will be simultaneously released. The shields for such dials as have not completed the proper movement will not be connected with the controlling plate and will not be affected by the movement thereof. Any lost motion or back lash in the gear train which might result in a subsequent dial completing the necessary movement a trifle later than this movement is completed by the preceding dials will not effect the simultaneous operation of the shields because the width of the lugs 38 on the shields and of the fingers 42 on the controlling plate is such that they will remain in line one with the other during a considerable movement of the respective dials and by a proper arrangement of the lugs upon the several shields the proper alinement of these lugs with the controlling fingers will be made certain.

The operation of the apparatus will be readily understood from the foregoing description thereof and it will be apparent that I have provided a direct reading index of such a character that only one numeral of each indicating member can be exposed at one time and that this numeral will always correctly indicate the actual registration on the indicating member; and that the mechanism is of such a character that the exposed numeral on the several indicating members will always correctly represent the registration on the index as a whole. It will further be apparent that the mechanism is very simple in its construction and operation and is of such a character that it can be produced at a relatively low cost.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a registering device, an indicating member having a plurality of numerals, a shield movably mounted in front of said indicating member, rotatable about the axis thereof and having an opening adapted to expose a single numeral, a separable connection between said shield and said indicating member to cause said shield to move with the dial during a predetermined portion of its movement, and means to disconnect said shield from said indicating member to permit the shield to move in a reverse direction.

2. In a registering device, an indicating member having a plurality of numerals, a shield movably mounted in front of said indicating member and having an opening adapted to expose a single numeral, said shield and said indicating member having cooperating parts to cause said shield to move with said indicating member during a portion of its movement, and means to impart bodily movement to said shield to separate said cooperating parts and permit said shield to move rearwardly.

3. In a registering device, an indicating member having a plurality of numerals, a shield movably mounted in front of said indicating member and having an opening adapted to expose a single numeral, said shield and said indicating member having cooperating parts to cause said shield to move with said indicating member during a portion of its movement, and means controlled by the movement of said indicating member for moving said shield relatively to said indicating member and thereby disconnecting the shield from the indicating member to permit the shield to be shifted to aline its opening with another numeral.

4. In a registering device, an indicating member having a plurality of numerals, a shield arranged in front of said indicating member and movable about the axis thereof, said indicating member having a plurality of projections spaced about the same, and said shield having a part arranged to be engaged by one of said projections to cause the shield to move with the indicating member, and means for moving said part of said shield out of engagement with the projection on said indicating member to permit said shield to move in a reverse direction.

5. In a registering device, an indicating member having a plurality of numerals, a shield arranged in front of said indicating member and movable about the axis thereof, said indicating member having a plurality of projections spaced about the same, said shield being mounted for bodily movement relative to said indicating member and having a rigid part adapted to be moved into and out of a position to be engaged by one of the projections on said indicating member, and means for imparting bodily movement to said shield to move said part out of engagement with said projection.

6. In a registering device, a rotatable dial having a plurality of numerals on the face thereof, and having a series of projections arranged about the periphery thereof, a shield mounted in front of said dial for movement about the axis thereof and having an opening adapted to expose a single numeral on said dial, a part carried by said shield and arranged to be engaged by one of said projections on said dial to cause said shield to move with said dial, and means for moving said part out of the path of said projection to permit said shield to be moved in a reverse direction.

7. In a registering device, a shaft, a dial mounted on said shaft and having a plurality of numerals arranged on the face thereof, and also having a series of projections spaced about the periphery thereof, a shield mounted on said shaft in front of said dial for movement about the axis of said shaft and for movement transversely to said shaft, a part carried by said shield and adapted to be engaged by one of the projections on said dial to cause said shield to move with said dial, and means for moving said shield transversely to said shaft to move said part out of the path of said projection.

8. In a registering device, a plurality of indicating members each having a plurality of numerals, a separate shield mounted in front of each of said indicating members and having an opening adapted to expose a single number on said indicating member, means for causing said shields to move with the respective indicating members during a predetermined portion of the movement thereof, and means for causing the shields of all of said indicating members which have completed said predetermined movement to be simultaneously moved in a reverse direction.

9. In a registering device, a plurality of indicating members each having a plurality of numerals, a separate shield mounted in front of each of said indicating members and having an opening adapted to expose a single number on said indicating member, means for causing said shields to move with the respective indicating members during a predetermined portion of the movement thereof, controlling means common to the several shields to release the same for reverse movement, and means controlled by one of said indicating memebers for actuating said controlling device.

10. In a registering device, a plurality of indicating members each having a series of numerals, a separate shield mounted in front of each of said indicating members and having an opening adapted to expose a single numeral on said indicating member, means for connecting said shields with the respective indicating members to cause the shields to move with the indicating members during a predetermined portion of their movements, and means controlled by one of said indicating members to simultaneously disconnect the shields from all of said indicating members which have completed said predetermined portions of their movement.

11. In a registering device, a plurality of indicating members each having a series of numerals, a separate shield mounted in front of each of said indicating members and having an opening adapted to expose a single numeral on said indicating member, means for connecting said shields with the respective indicating members to cause the shields to move with the indicating members during predetermined portions of their movements, a controlling device common to all of said shields and having means for disconnecting the same from the respective indicating members, and means under the control of one of said indicating members to actuate said controlling device.

12. In a registering device, a plurality of indicating members each having a series of numerals, a separate shield for each indicating member having an opening adapted to expose a single numeral on said indicating member, each shield being mounted for bodily movement with relation to its indicating member, each shield and its indicating member having cooperating parts to cause said shield to move with said indicating member during a portion of its movement, a controlling member common to the several shields, means for connecting each shield with said controlling member when said shield has completed said portion of its movement, and means controlled by one of said indicating members to cause said controlling member to simultaneously actuate the shields connected therewith to disconnect the same from the respective indicating members.

13. In a registering device, a plurality of indicating dials each having a series of numerals on the face thereof, a separate shield mounted for movement about the axis of each dial and having an opening to expose a single numeral on said dial, said shield also being movable transversely to the axis of said dial, each dial having a plurality of projections arranged about the periphery thereof, each shield having a part adapted to be moved into and out of line with one of said projections by the transverse movement of said shield, a controlling member having a projection arranged adjacent to each shield, each shield having a lug adapted to be moved into a position above the corresponding projection on said controlling member when the shield and the dial with which it is connected have completed a predetermined movement, and means controlled by one of said dials to impart upward movement to said controlling member.

14. In a registering device, a plurality of indicating dials each having a series of numerals on the face thereof, a separate shield mounted for movement about the axis of each dial and having an opening to expose a single numeral on said dial, said shield also being movable transversely to the axis of said dial, each dial having a plurality of projections arranged about the periphery thereof, each shield having a part adapted to be moved into and out of line with one of said projections by the transverse movement of said shield, a controlling member having a projection arranged adjacent to each shield, each shield having a lug adapted to be moved into a position above the corresponding projection on said controlling member when the shield and the dial with which it is connected have completed a predetermined movement, a lever having one end arranged to impart upward movement to said controlling member, and a part connected with one of said dials to control the movement of said lever.

15. In a registering device, a plurality of indicating dials each having a series of numerals on the face thereof, a separate shield mounted for movement about the axis of each dial and having an opening to expose a single numeral on said dial, said shield also being movable transversely to the axis of said dial, each dial having a plurality of projections arranged about the periphery thereof, each shield having a part adapted to be moved into and out of line with one of said projections by the transverse movement of said shield, a controlling member having a projection arranged adjacent to each shield, each shield having a lug adapted to be moved into a position above the corresponding projection on said controlling member when the shield and the dial with which it is connected have completed a predetermined movement, a lever pivotally mounted between its ends, having one end weighted and having its other end arranged to engage said controlling member to impart upward movement thereto, and an actuating device connected with one of said dials and having means for lifting the weighted end of said lever and releasing the same at the end of each step of movement of said dial.

In testimony whereof, I affix my signature hereto.

ISAAC S. DEMENT.